Patented Mar. 3, 1936

2,032,635

UNITED STATES PATENT OFFICE 2,032,635

BLACK SULPHUR DYESTUFFS

Paul Schick, Frankfort-on-the-Main-Fechenheim, and August Bansa, Frankfort-on-the-Main, Germany, assignors to General Aniline Works, Inc., New York, N. Y., a corporation of Delaware No Drawing. Application March 3, 1934,
Serial No. 713,948

8 Claims. (Cl. 260—19)

Our present invention relates to black sulphur dyestuffs.

It is already known to prepare brown to black sulphur dyestuffs of a peculiar fastness by acting with alkali metal poly-sulphides on compounds of the type of 4-hydroxy-diphenyl-amine and 4-hydroxy-phenyl-naphthyl-amine. The hitherto commercial dyestuffs of this kind exhibit, however, some disadvantages.

In contradistinction thereto the new dyestuffs of our present invention are distinguished by a series of technically favorable qualities.

They are prepared by simultaneously acting with alkali polysulphides on a mixture of the following materials:

The first component is a naphthalene compound corresponding to the general formula

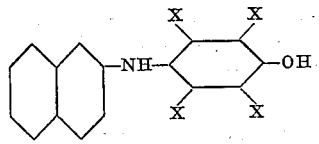

(wherein the X's mean hydrogen atoms whereof one or more may be replaced by halogen, alkyl, alkoxy or carboxylic acid groups).

The second component is an indophenol (or leuco indophenol) derived from an amine of the benzene, naphthalene or carbazole series and a p-amino- (or p-nitroso-) phenol. Such compounds are for instance 3-(4'-hydroxyphenylamino)-carbazole, its nuclear or nitrogeneous substitution products, indophenols prepared by oxidizing m-phenylene-diamino and p-aminophenol or prepared by condensing diphenylamine with p-nitroso-phenol.

As the third component, aromatic nitro- (or amino-) compounds containing further nitro, amino or hydroxy groups may be added advantageously. Such compounds are for instance: nitrophenol, p-amino-phenol, phenylene-diamine, dinitro-naphthalenes, nitro-carbazoles.

The proportion of the amounts of the components may be varied within widely separated limits. Advantageously a predominant amount of the first component is used.

The reaction of the polysulphides is carried out in the customary manner. The addition of an organic solvent is especially favorable. Furthermore an oxidation agent, as sodium nitrite, may be advantageously added at the beginning of or during or after the sulphurizing process or also while working up the product. Thereby the duration of reaction is shortened.

As to the aforesaid series of technically favorable qualities, our new dyestuffs yield on vegetable fibers black dyeings distinguished by a peculiar bloomy bluish black shade. These dyeings are fast especially to light, chlorine and to soaping at the boil. The goods thus dyed exhibit an excellent fastness to storing. Furthermore the new dyestuffs show the surprising advantage of a good solubility in sodium sulphide solutions. They can, therefore, be dyed without any difficulty from the sodium sulphide bath, even on apparatus known to require a high solubility.

In order to further illustrate our invention the following examples are given; but we wish it, however, to be understood that our invention is not limited to the particular products or reaction conditions stated therein.

Example 1

A mixture of 174 parts of caustic soda, 392 parts of sulphur and about 720 parts of n-propyl-alcohol are boiled for about half an hour in a vessel provided with a steam jacket and a reflux condenser. To the polysulphide solution thus formed, 160 parts of 2-(4'-hydroxyphenylamino)-naphthalene, 20 parts of 3-(4'-hydroxyphenylamino)-carbazole and 26 parts of p-nitro-phenol are added and the whole is boiled at an inner temperature of 101° C. for 15–40 hours. The mass is then allowed to cool to about 90° C., mixed with 50–100 parts of sodium nitrite and again heated for 1–2 hours under the reflux condenser. Thereby it becomes rather thick. After the addition of about 1,600 parts of water, the propyl-alcohol is distilled off by means of steam. The evaporated liquor is gradually compensated by the addition of water so that the final volume is about 2,500 parts. The dyestuffs, which is precipitated thereby or also by the addition of salt or by introducing air, is filtered and blown dry without being washed. Then it is again made to a paste by means of about 2,400 parts of water. The mixture is rendered distinctly acid with about 110 parts of crude hydrochloric acid and stirred at 60° C. for about one hour.

The precipitate is filtered, washed acid free and dried, advantageously in the vacuum.

Example 2

A polysulphide solution is prepared in a manner similar to that described in Example 1 but with the use of about 820 parts of methyl-cyclohexanol. 160 parts of 2(4'-hydroxyphenylamino)-naphthalene, 20 parts of 3(4'-hydroxyphenylamino)-carbazole and 20 parts of p-aminophenol are added thereto and the whole is boiled under a reflux condenser at an inner temperature of 159° C. for about 3 hours. Then the mass is diluted with about 1600 parts of water, freed from methyl-cyclohexanol by means of steam and worked up as described in Example 1.

Example 3

A polysulphide solution is prepared in a manner similar to that described in Example 1 but with the use of about 725 parts of ethyl-alcohol. 190 parts of 2(4'hydroxy-3'-carboxy-phenylamino)-naphthalene, 20 parts of 3(4'-hydroxy-phenylamino)-carbazole and 25 parts of m-toluylendiamine are added thereto and the whole is boiled under a reflux condenser at an inner temperature of 86° C. for about 60 hours. Then the mass is allowed to cool to about 70° C., mixed with 100 parts of sodium nitrite and again heated under the reflux condenser for 1–2 hours. Thereafter it is worked up and the dyestuff is isolated as described in Example 1.

When in this example 3-(4'-hydroxy-prenylamino)-carbazole is replaced by the equivalent amount of 3-(4'-hydroxy-phenylamino)-N-ethyl-carbazole and the process is otherwise carried out in a like manner, a similar dyestuff is obtained.

Example 4

A polysulphide solution is prepared as described in Example 1, but with the use of about 740 parts of butanol. 180 parts of 2-(4'-hydroxy-phenylamino)-naphthalene and 20 parts of 3-(4' - hydroxy-phenylamino) - N-ethyl-carbazone are added thereto and the whole is boiled under a reflux condenser at an inner temperature of about 110° C. for about 15 hours. The mass is allowed to cool to about 90° C., mixed with 80 parts of sodium nitrite and again heated under the reflux condenser for 1–2 hours. The dyestuff is isolated according to Example 1.

Example 5

A polysulphide solution is prepared as described in Example 1, but with the use of about 725 parts of ethyl-alcohol. 170 parts of 2-(4'-hydroxy-phenylamino)-naphthalene and 30 parts of the indophenol prepared from diphenylamine and from p-nitrosophenol are added thereto and the whole is boiled under a reflux condenser at an inner temperature of about 85° C. for about 60 hours. The mass is allowed to cool to about 70° C., mixed with 100 parts of sodium nitrite and again heated under the reflux condenser for 1–2 hours. The dyestuff is isolated according to Example 1.

We claim:

1. Black sulphur dyestuffs prepared by acting with alkali metal polysulphides on a mixture containing (a) a naphthalene compound corresponding to the general formula

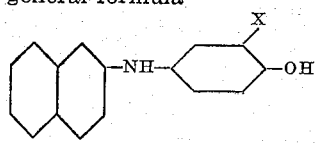

wherein X means hydrogen or the carboxylic acid radicle and (b) a compound of the group consisting of indophenols and leuco-indophenols derived from amines of the benzene, naphthalene or carbazole series and from p-aminophenols or p-nitrosophenols.

2. Black sulphur dyestuffs prepared by acting with alkali metal polysulphides on a mixture consisting of (a) a naphthalene compound corresponding to the general formula

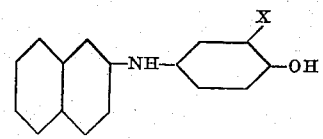

wherein X means hydrogen or the carboxylic acid radicle (b) a compound of the group consisting of indophenols and leucoindophenols derived from amines of the benzene, naphthalene or carbazole series and from p-aminophenols or p-nitrosophenols and (c) a compound of the group consisting of aromatic nitro and amino compounds containing further nitro, amino or hydroxy groups.

3. Black sulphur dyestuffs prepared by acting with alkali metal polysulphides on a mixture consisting of (a) a predominant amount of a naphthalene compound corresponding to the general formula

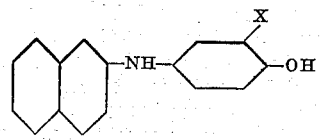

wherein X means hydrogen or the carboxylic acid radicle (b) an indophenol obtained by oxidizing together an aminophenol and an amine of the benzene, naphthalene or carbazole series and (c) a compound of the group consisting of aromatic nitro and amino compounds containing further nitro, amino or hydroxy groups.

4. Black sulphur dyestuffs prepared by acting with alkali metal polysulphides on a mixture consisting of (a) a naphthalene compound corresponding to the general formula

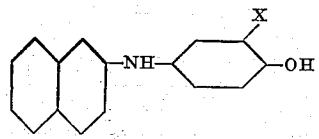

wherein X means hydrogen or the carboxylic acid radicle (b) an indophenol obtained by condensing together a nitrosophenol and a carbazole and (c) a compound of the group consisting of aromatic nitro and amino compounds containing further nitro, amino or hydroxy groups.

5. Black sulphur dyestuff prepared by acting with an alcoholic alkali metal polysulphide on 2(4'-hydroxy-phenylamino)-naphthalene, 3(4'-hydroxy-phenylamino)-carbazole and p-nitrophenol with the addition of sodium nitrite.

6. Black sulphur dyestuff prepared by acting with an alcoholic alkali metal polysulphide on 2(4'-hydroxy-3'-carboxy - phenylamino) - naphthalene, 3 ( 4' - hydroxy - phenylamino)-N-ethyl-carbazole and m-toluylendiamine with the addition of sodium nitrite.

7. Black sulphur dyestuff prepared by acting with an alcoholic alkali metal polysulphide on 2(4'-hydroxy-phenylamino)-naphthalene and the indophenol obtained by condensing together p-nitrosophenol and diphenylamine with the addition of sodium nitrite.

8. Black sulphur dyestuffs prepared by acting with alkali metal polysulphides on a mixture containing (a) a naphthalene compound corresponding to the general formula:

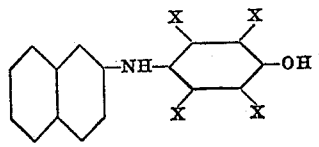

wherein the X's mean hydrogen or the carboxylic acid radicle, and (b) a compound of the group consisting of indophenols and leucoindophenols derived from the benzene, naphthalene or carbazole series and from p-amino-phenols or p-nitrosophenols.

PAUL SCHICK.
AUGUST BANSA.